United States Patent [19]

Palmer

[11] 4,380,325
[45] Apr. 19, 1983

[54] GAS OPERATED VALVE ACTUATOR

[76] Inventor: Thomas W. Palmer, 2907 Del Monte Crt., Missouri City, Fort Bend County, Tex. 77459

[21] Appl. No.: 221,461

[22] Filed: Dec. 30, 1980

[51] Int. Cl.³ .................. F16K 31/14; F16K 31/50; F16K 31/52

[52] U.S. Cl. .......................................... 251/14; 74/25; 74/424.8 VA; 74/625; 192/114 R; 251/59; 251/229; 251/267; 251/272; 251/276; 251/278; 251/251; 251/284

[58] Field of Search .................. 251/14, 59, 74, 265, 251/267, 266, 272, 278, 276, 229, 73, 251, 284, 249.5, 248; 74/424.8 VA, 625, 25, 89.15; 192/114 R

[56] References Cited

U.S. PATENT DOCUMENTS

| | | | |
|---|---|---|---|
| 2,527,458 | 10/1980 | Schurr | 192/114 R |
| 2,618,366 | 11/1952 | Bryant | 74/625 |
| 2,636,515 | 4/1953 | Morey | 74/625 |
| 2,743,897 | 5/1956 | Elliott et al. | 251/59 |
| 2,775,906 | 1/1957 | Elliott et al. | 74/625 |
| 2,900,842 | 8/1959 | Simpson | 74/625 |

OTHER PUBLICATIONS

E-I-M Valve Controls, Catalog G263, E-I-M Company, Inc., 1963.
Limitorque Valve Controls, Bulletin, No. 13-59, Limitorque Corp., May 1978.
Limitorque Valve Controls, Bulletin, No. 871, Limitorque Corp., Apr. 1976.

Primary Examiner—George L. Walton
Attorney, Agent, or Firm—Fulbright & Jaworski

[57] ABSTRACT

A gas-operated valve actuator having a gas operated motor, a mechanism for disengaging the valve's manual operation apparatus, and a device for quickly shutting off the actuator when the valve's drive shaft reaches its travel limit.

5 Claims, 9 Drawing Figures

GAS OPERATED VALVE ACTUATOR

BACKGROUND OF THE INVENTION

1. Field of the Invention

The present invention relates to the field of valve actuators and more particularly to gas operated valve actuators.

2. Description of the Prior Art

There are a variety of prior art valve actuators or valve controls which are operated either electrically, hydraulically, or pneumatically. In those valve actuators which permit manual as well as powered operation, there is a direct one-to-one ratio of the hand wheel shaft to the powered shaft which presents a dangerous condition for operating personnel when the hand wheel shaft rotates at the same time that the actuator is in operation. If the hand wheel is not permanently attached to the hand wheel shaft, when power is applied, the hand wheel can fly off injuring both the operators and the equipment. If the hand wheel is permanently mounted to the hand wheel shaft, when power is applied to the actuator, a flywheel effect ensues which will result in an over-driving of the valve damaging the valve or jamming it and making it impossible to open it either manually or by powered operation.

In a gas operated actuator, if some of the power gas is stored in the transmission lines between the actuators cut off valves and limit valves, or if the power gas is not turned off, and the hand wheel is then turned, injury can result since, as soon as the limit valves are open, the gas will be released causing the motor to turn which will then power-drive the band wheel backwards.

In those actuators using spool-type valves, the valves close very slowly as the actuator approaches the limit of its travel. Therefore, at the limit of its travel, torque output of the actuator is reduced; but full torque output up to the moment of shutoff is desirable. Also, in many of the prior art actuators, the power gas is not immediately exhausted to the atmosphere but rather is routed from a motor back through a selector valve. This throttling or choking effect restricts the flow of the gas and reduces the power available. In those actuators that use limit and selector valves having rings mounted on spools, ingredients in natural gas causes the rings to swell resulting in damaged or severed rings and stuck valves. In those actuators in which the limit valve springs are located above the spools, it is a common occurrence for the area around the springs to fill with condensate which thereafter freezes and causes the actuator to fail.

Many actuators are of the cylinder type which usually rely upon a hydraulic manual pump for manual operation. This is undesirable because of possible oil loss, control valve malfunction, and the temperature effect on hydraulic oils. Low pressure cylinder actuators have the added problems associated with pressure regulators and relief valves. Many cylinder actuators on gate valves rely on check valves to prevent unwanted closure and are subject to creepage. A number of cylinder actuators, including rotating vane cylinder actuators, although available in both high and low pressure type, have all the above limitations. Some electrical powered actuators have been modified in an attempt to provide an actuator with the desired features. These actuators use a pneumatic motor coupled to worm gearing which is used in the main drive gearing. The result is a hybrid actuator with unreliable limit control, inefficient gearing and makeshift limit valves. The main disadvantage is the extreme number of the handwheel turns required due to the worm gearing. Gas consumption rates are also high with this type of actuator.

SUMMARY OF THE INVENTION

The present invention is directed to a gas operated valve actuator which eliminates the problems and difficulties associated with the prior art actuators and controls, overcomes their disadvantages, and provides a safe and efficient valve actuator.

The present invention has a body, a gas operated motor means, a means for automatically disengaging the valve's manual operation means and a control means which includes limit valve shutoff means that provide almost instantaneous shutoff of the actuator when it reaches its travel limit. The control means has dual lines running to the motor means so that the motor can be run in either a forward or reverse direction for either opening or closing a valve. A selector valve is provided which can either shutoff completely the input gas or route it through one or the other of the lines to the motor. Each line to the motor has a limit valve which when activated permits the passage of gas through its respective line to the motor and at the same time activates and closes an exhaust valve to prohibit the escape of the gas through the exhaust port and to insure that the gas goes to the motor. After the gas goes to the motor, it exits the motor through the other motor line and then encounters the other limit valve which operates to close off the line to the selector valve to insure that the gas exiting from the motor is exhausted through the exhaust port of the exhaust valve.

A line is provided from the input gas line prior to the selector valve so that as soon as gas is introduced into the input line, gas is routed to a cylinder whose piston contacts and then pushes a lever which in turn disengages the actuator's manual operating means such as a hand wheel.

Almost instantaneous shutoff of the limit valves is provided by a limit valve shutoff means which has a cam screw having neutral areas and both a fine pitched middle area and a course pitched end area at each end. Two major cams travel on the fine pitched area and the gearing between the motor and the limit valve shutoff means is such that the major cams travel in step with the gearing means that engages and rotates the shaft of the valve to be actuated. Each major cam corresponds to a tripping cam which is initially positioned on the fine threaded midsection. The major cam has finger means which contact and push the tripping cam onto the course threaded area of the cam screw. The course threaded area of the cam screw is such that when the tripping cam encounters it, the tripping cam moves down the course threaded area very quickly where it contacts one of two limit valve support means which are pivotally connected to the body. Upon contact by the tripping cam, the limit valve support means pivots releasing its support of the limit valve poppet causing almost instantaneous shutoff of the gas through the limit valve and through the motor line to the motor thereby shutting down the motor.

It is therefore an object of the present invention to provide a safe and efficient gas operated valve actuator which eliminates the inherent difficulties and problems associated with the prior art actuators and controls.

Another object of the present invention is to provide a gas operated actuator wherein the manual operation means of the actuator will be disengaged when gas power is supplied to the actuator and wherein the manual operation means can be engaged when the power is shut off.

Yet another object of the present invention is the provision of a gas-powered actuator having disengageable manual operating means in order to eliminate the flywheel effect of such means and yet will permit the permanent installation of manual operating means such as a handwheel.

A further object of the present invention is the provision of an actuator wherein poppet-type limit valves are used so that advantage can be taken of full power almost to the moment of valve shutoff.

A still further object of the present invention is the provision of an actuator using poppet-type valving which can be opened and closed solely by gas pressure rather than by spring action.

A particular object of the present invention is the use of poppet-type valves which have a ring that cannot fail despite swelling.

Another object of the present invention is the provision of an actuator having a limit valve control means which employs a tripping cam mechanism that produces almost instantaneous snap action shutoff of the limit valves when the valve reaches the limit of its travel.

Yet another object of the present invention is the provision of an actuator wherein exhaust valve means are provided which exhaust the powering gas to the atmosphere thereby reducing or eliminating any choking effect on the gas.

Still another object of the present invention is the provision of an actuator wherein the powering gas which flows through the motor passes into the atmosphere rather than back through the selector valve of the actuator.

A further object of the present invention is the provision of an actuator which can use a selector valve of the shearseal type having no spools and no rings.

A still further object of the present invention is the provision of an actuator which can use a selector valve having rings in its body but rings that are not on a spool.

A particular object of the present invention is the provision of a tripping cam mechanism that produces almost instantaneous snap action.

DESCRIPTION OF PREFERRED EMBODIMENT

Referring now to FIGS. 1, 7, 8 and 9, the actuator 10 according to the present invention includes the housing 12, the selector valve means 40 mounted in the housing 12, the limit valve means 50 and 60 connected to the selector valve means 40 and mounted in the housing 12, the exhaust means 70 disposed between the limit valve means 50 and 60, the tripping mechanism 90 disposed beneath the limit valve means 50 and 60, the disengagement means 20, the motor means 28, and the various gearing means including the motor gearing means 30, the second shaft gearing means 27, the cam screw gearing means 114, and the actuator gearing means 83.

Figure 1:
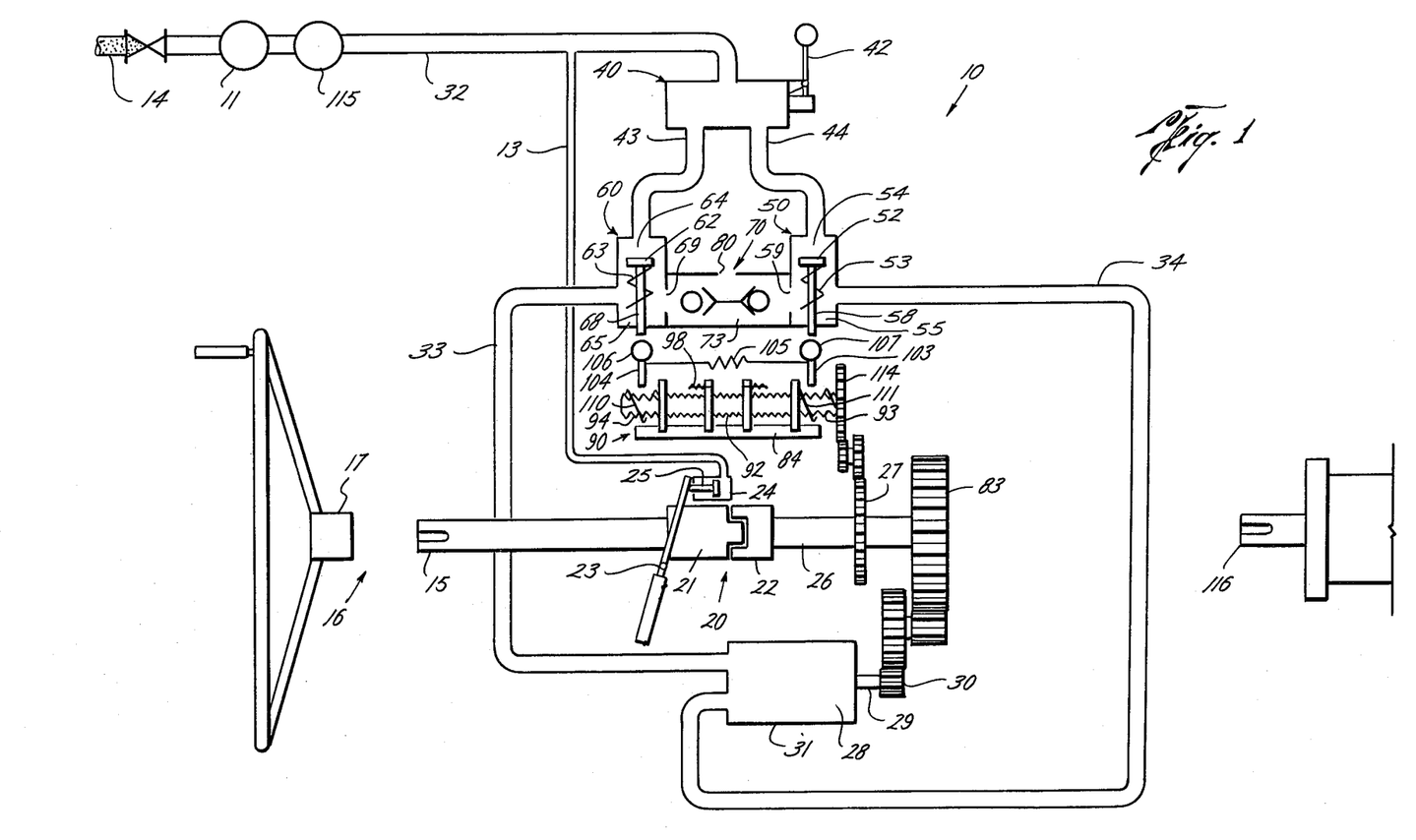
FIGS. 1, 2, 3 and 4 are partial elevational schematic views illustrating the sequence of operation of a gas operated valve actuator according to the present invention.
Figure 2:
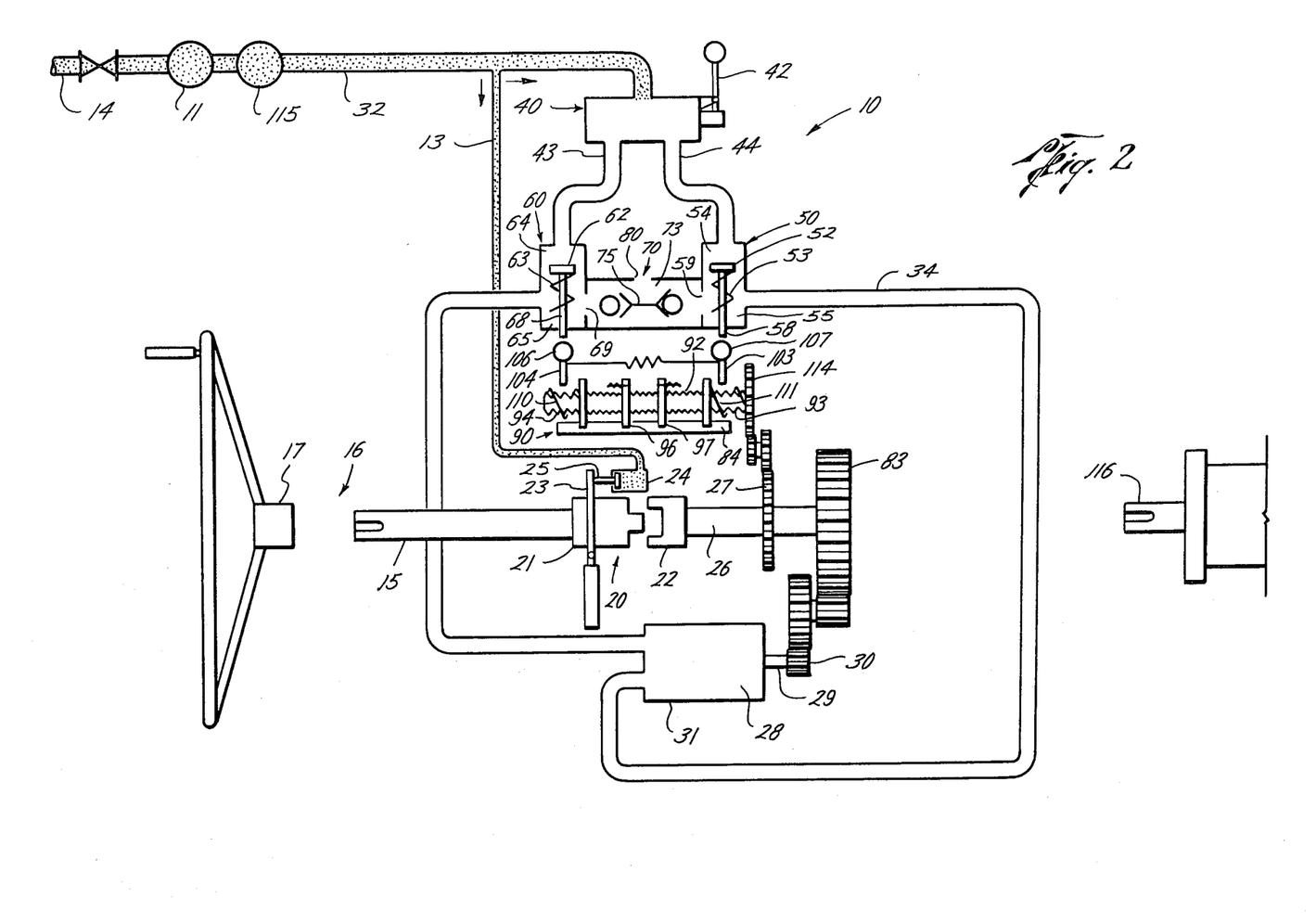
Figure 3:
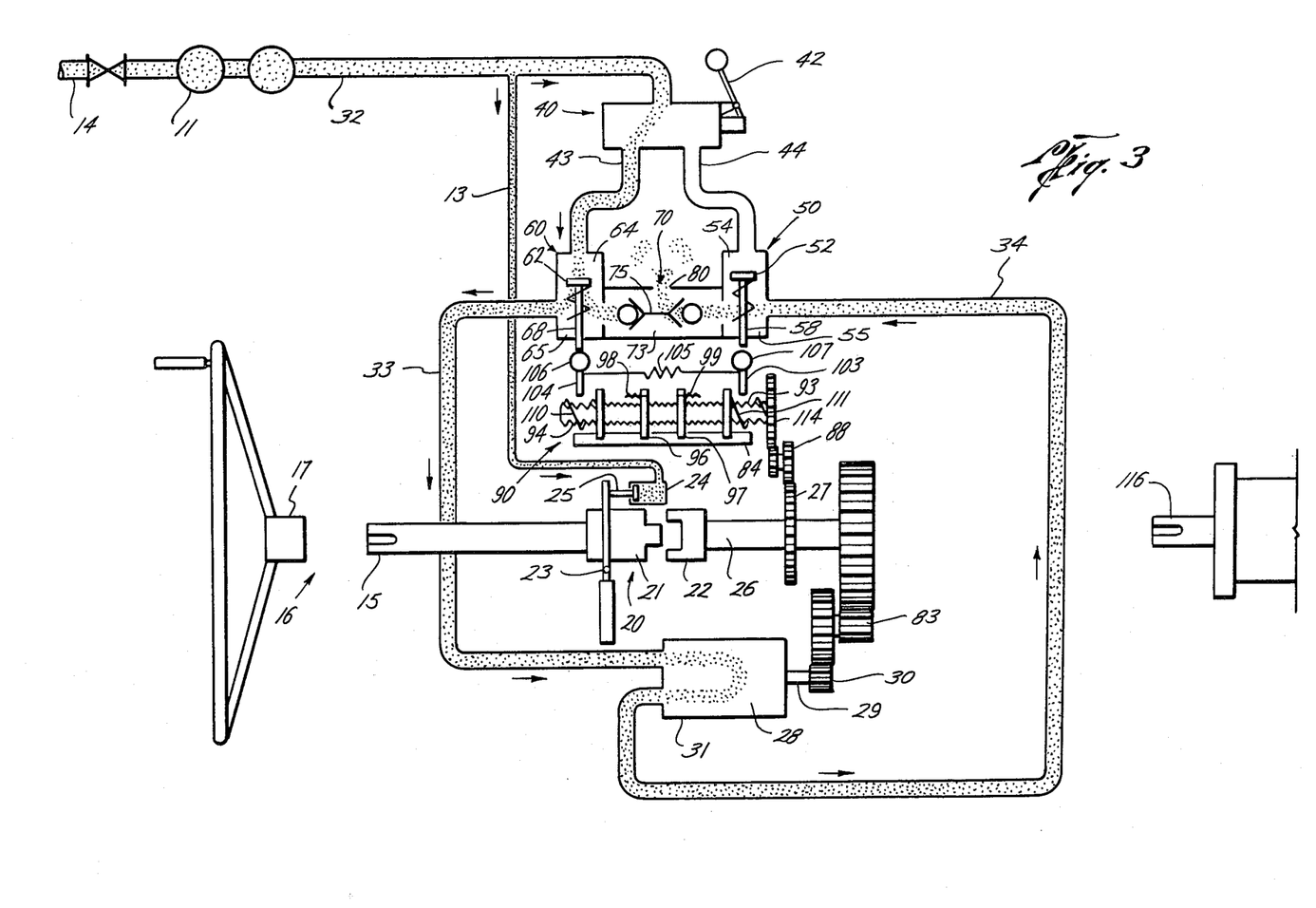
Figure 4:
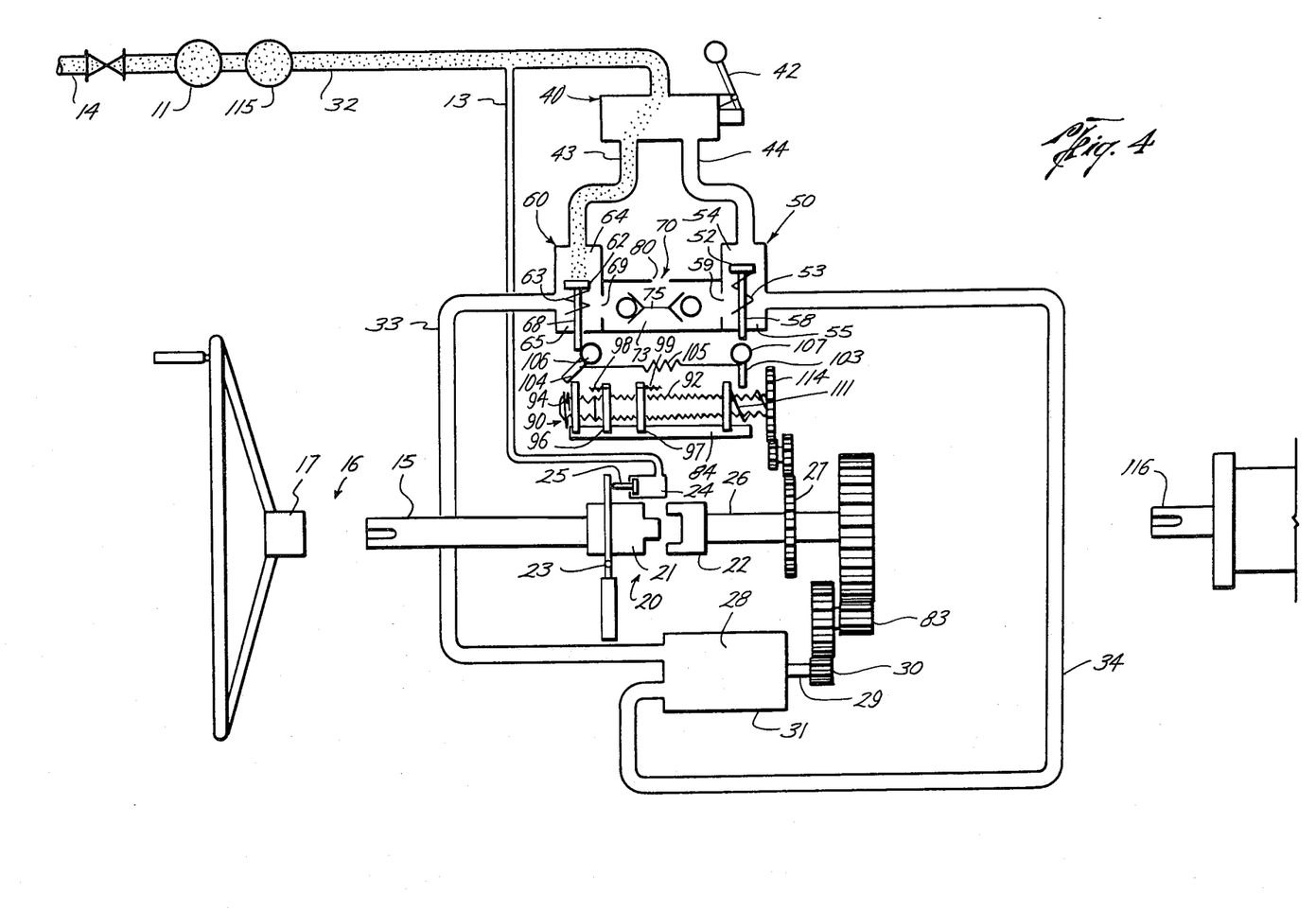
Figure 5:
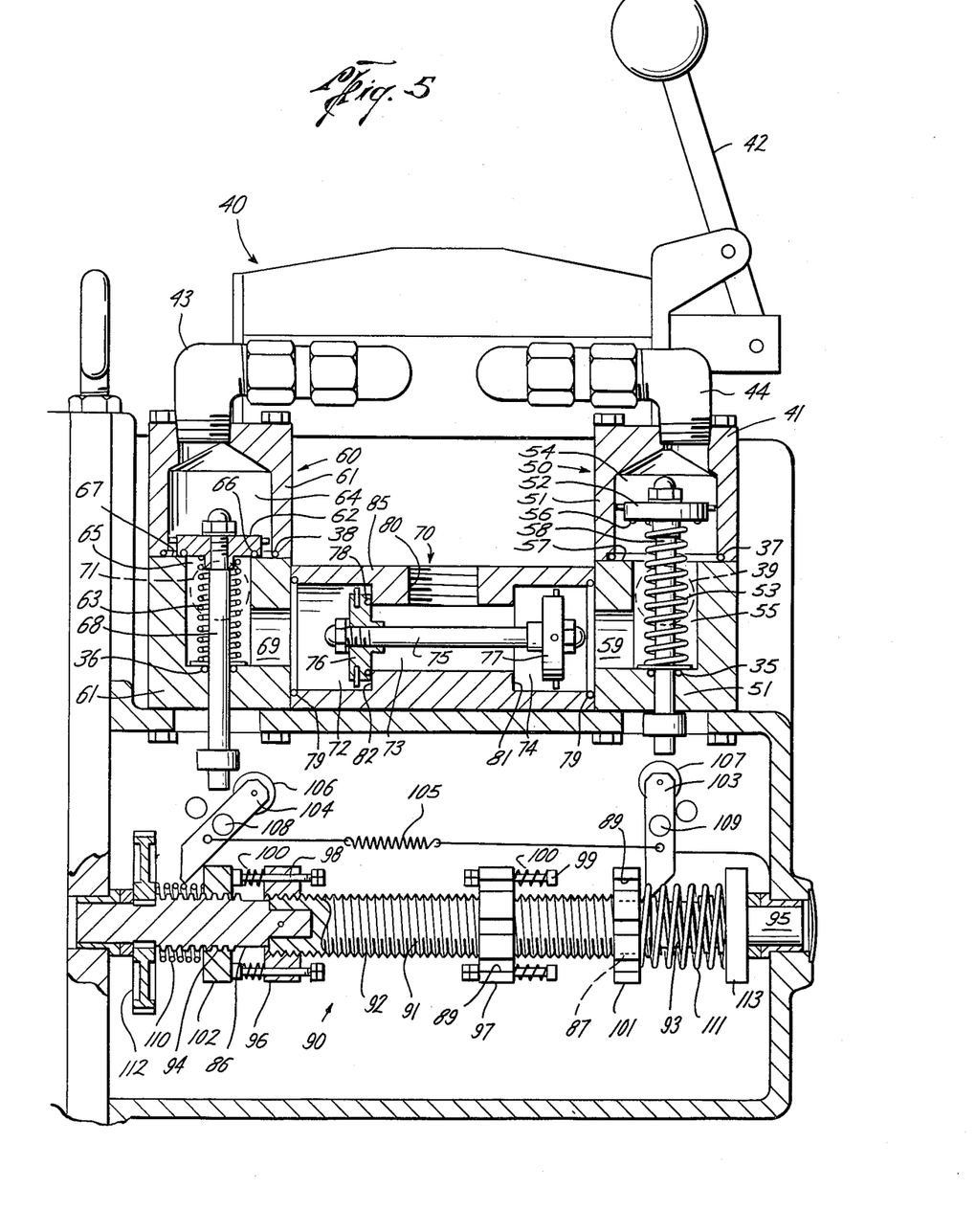
FIG. 5 is an elevational view, in partial cross section of valves and a tripping mechanism of an actuator according to the present invention.

Referring now to FIGS. 1 and 5, the selector valve means 40 is a conventional selector valve which directs the flow of the input gas 14 to one or the other of the preselected limit valve lines, either the forward limit valve line 43 to the forward limit valve means 60 or the reverse limit valve line 44 to the reverse limit valve means 50. The selector valve means 40 has the selector handle 42 which is a three position handle. In the mid-position as shown in FIG. 2, the input gas is not permitted to flow through the selector valve means. In the left position as shown in FIG. 3, the input gas 14 is permitted to flow through the selector valve means to the forward limit valve means line 43, but not to the reverse limit valve means line 44. In the right position (not shown), the input gas 14 is permitted to flow through the selector valve means to the reverse limit valve means line 44, but not through the forward limit valve means line 43.

Referring now to FIGS. 1 and 5, the limit valve means 50 and 60 control the flow of the input gas 14 to the motor means 28. The top chamber 64 of the housing 61 of the limit valve means 60 communicates with the selector valve means 40 through the forward limit valve means line 43. The input gas 14 flows through the forward limit valve means line 43 into the top chamber 64 in the housing 61 of the forward limit valve means 60. The gas 14 then flows from the top chamber 64, around the poppet 62, into the bottom chamber 65 in the housing 61. The poppet 62 is mounted on the piston 68 and the piston 68 is in turn movably mounted in the bottom of the housing 61 and the piston 68 extends through and beyond the bottom of the housing 61. The circumference of the poppet 62 is smaller than the circumference of the top chamber 64 so that gas is permitted to flow around the poppet 62 and into the bottom chamber 65. The bottom chamber 65 presents the shoulder 67 to the poppet 62 and its corresponding O-ring 66 so that when the piston 68 and the poppet 62 move downwardly and contact the shoulder 67, the flow of gas from the top chamber 64 to the bottom chamber 65 is prevented as the O-ring 66 comes into sealing contact with the shoulder 67. The O-ring 38 provides a seal between the top chamber 64 and the bottom chamber 65. The O-ring 36 provides a seal between the piston 68 and the bottom of the housing 61. The bottom chamber 65 has the opening 71 to permit the bottom chamber 65 to communicate with the forward motor line 33. The bottom chamber 65 also has the opening 69 to permit the bottom chamber 65 to communicate with the left chamber 72 of the exhaust means 70. The spring 63 is mounted around the piston 68 to provide force to oppose the pressure of the input gas 14.

Referring now to FIGS. 1 and 5, the reverse limit valve means 50 is like the forward limit valve means 60.

The top chamber 54 of the housing 51 of the reverse limit valve means 50 communicates with the selector valve means 40 through the reverse limit valve means 44. The input gas 14 flows through the reverse limit valve means line 44 into the top chamber 54 in the housing 51 of the reverse limit valve means 50. The gas 14 then flows from the top chamber 54 around the poppet 52, into the bottom chamber 55 in the housing 51. The poppet 52 is mounted on the piston 58 and the piston 58 is in turn movably mounted in the bottom of the housing 51 and the piston 58 extends through and beyond the bottom of the housing 51. The circumference of the poppet 52 is smaller than the circumference of the top chamber 54 so that gas is permitted to flow around the poppet 52 and into the bottom chamber 55. The bottom chamber 55 presents the shoulder 57 to the poppet 52 and its corresponding O-ring 56 comes into sealing contact with the shoulder 57. The O-ring 37 provides a seal between the top chamber 54 and the bottom chamber 55. The O-ring 35 provides a seal between the piston 58 and the bottom of the housing 51. The bottom chamber 55 has the opening 39 to permit the bottom chamber 55 to communicate with the reverse motor line 34. The bottom chamber 55 also has the opening 59 to permit the bottom chamber 55 to communicate with the right chamber 74 of the exhaust means 70. The spring 53 is mounted around the piston 58 to provide force to oppose the pressure of the input gas 14.

The exhaust means 70 is disposed between and in communication with both the forward limit valve means 60 and the reverse limit valve means 50. Within the housing 85 of the exhaust means 70 are three chambers, the left chamber 72, the middle chamber 73 and the right chamber 74. The piston 75 having mounted thereto the poppets 76 and 77 is movably mounted within the housing 85. The middle chamber 73 is smaller in size than the left chamber 72 and the right chamber 74 so that the middle chamber 73 presents the shoulder 82 to the left chamber 72 and the shoulder 81 to the right chamber 74. The circumference of the poppet 76 is smaller than the circumference of the left chamber 72 so that the input gas flowing through the opening 69 of the forward limit valve means 60 will flow around the poppet 76 prior to the contact of the O-ring 78 of the poppet 76 with the shoulder 82. The O-ring 78 is mounted to the poppet 76 to provide sealing contact of the poppet 76 with the shoulder 82 thereby preventing the flow of gas from the left chamber 72 to the middle chamber 73 of the exhaust means 70 upon contact of the poppet 76 with the shoulder 82.

The middle chamber 73 of the exhaust means 70 has formed therein the exhaust port 80 for permitting the exhausting of gas to the atmosphere. As shown in FIGS. 5 and 3, the input gas 14 has been directed through the forward motor line 33, to the motor means 28, thence through the reverse motor line 34, and through the reverse limit valve means 50, into the exhaust means 70 and to the atmosphere through the exhaust port 80. The poppet 77 on the piston 75 is disposed in the right chamber 74. The O-ring 79 provides sealing contact between the left chamber 72 of the exhaust means 70 and the housing 61 of the forward limit valve means 60 and also between the right chamber 74 of the exhaust means 70 and the bottom chamber 55 of the reverse limit valve means 50.

Figure 6:
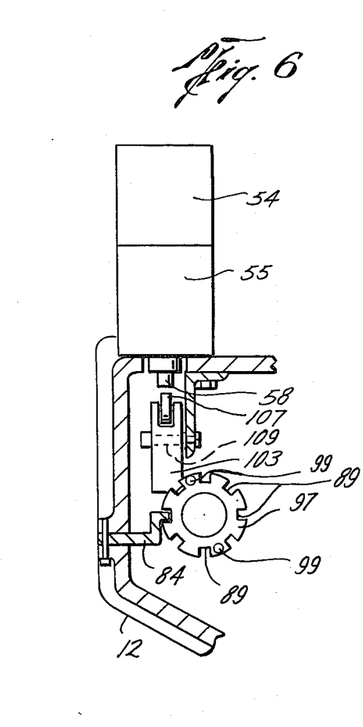
FIG. 6 is an elevational side view of a tripping mechanism of an actuator according to the present invention.
Figure 8:
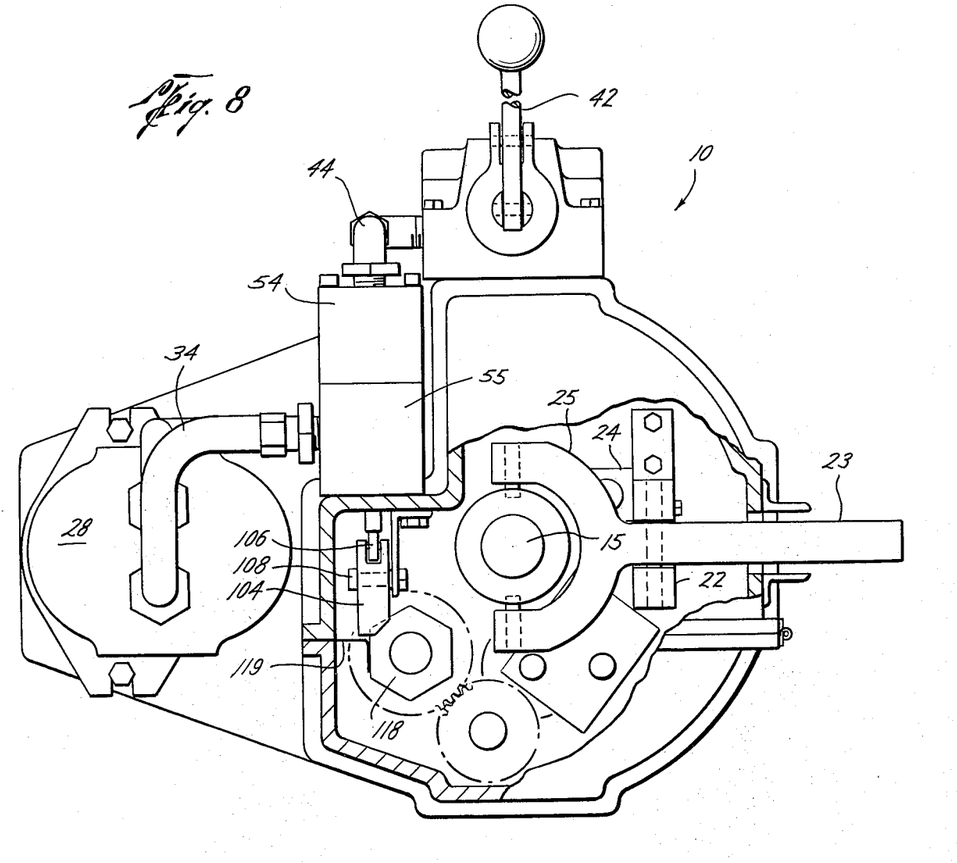
FIG. 8 is an elevational end view in partial cut away of an actuator according to the present invention.
Figure 9:
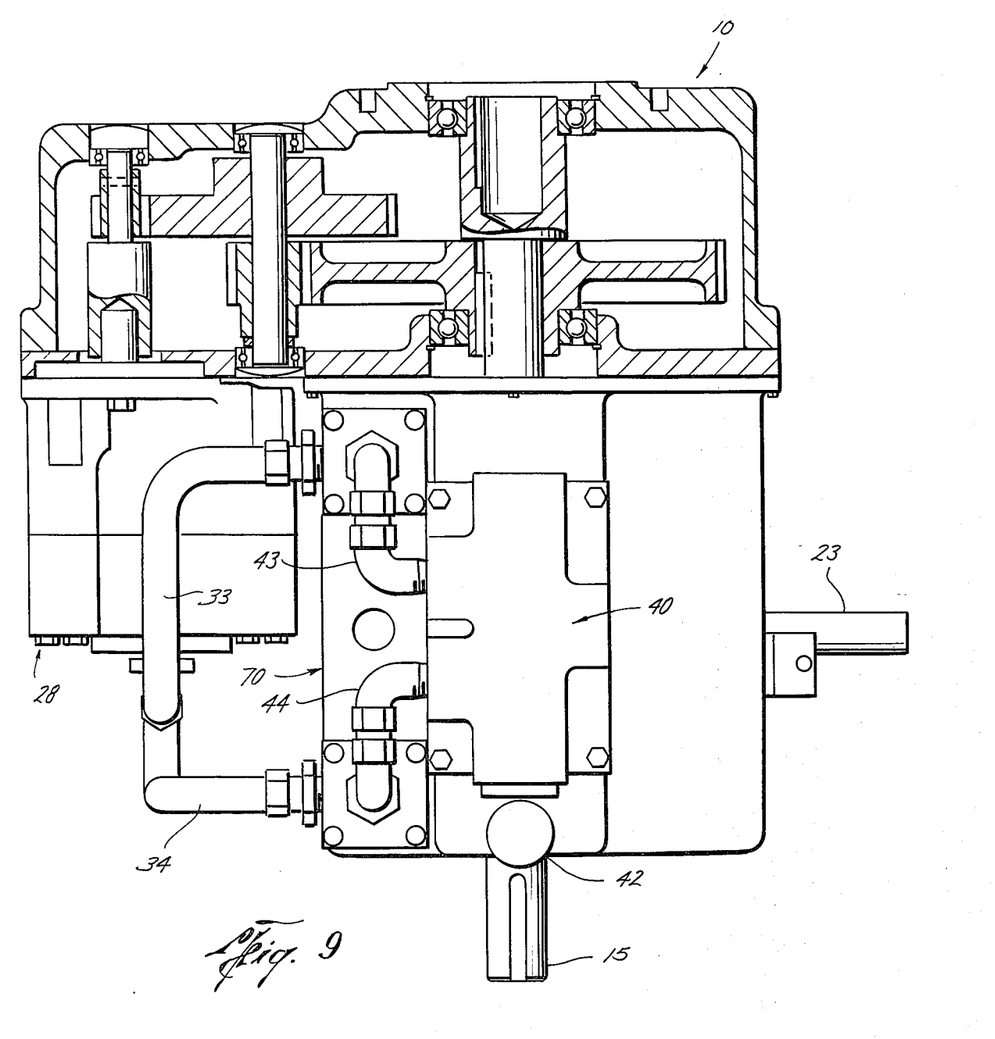
FIG. 9 is a top plan view of an actuator according to the present invention.

Referring now to FIGS. 1, 5, and 6, the tripping mechanism 90 is disposed in the housing 12 beneath both of the limit valve means 50 and 60. The cam screw 91 of the tripping mechanism 90 has areas in which the screw is of different pitches. The middle area 92 has a fine pitch as compared to both of the end areas. The left end 94 and the right end 93 of the cam screw 91 have a course pitch as compared to the pitch of the middle area. There is a left neutral area 86 and a right neutral area 87 on the cam screw 91. The major left cam 96 and the major right cam 97 are movably mounted on the middle area 92 of the cam screw 91. The major left cam 96 has the left finger means 98 movably mounted therein and extending therefrom toward the left end 94 of the cam screw 91. The major right cam 97 has the right fingers 99 movably mounted therein and extending therefrom toward the right end 93 of the cam screw 91. the left finger means 98 have mounted therearound the springs 100 to provide a resisting force when the left finger means 98 contact the left tripping cam 102 which is mounted on the left neutral area 86 of the cam screw 91. The finger means 99 of the right major cam 97 have the spring means 100 mounted therearound to provide a resisting force when the finger means 99 contact the right trip cam 101 which is on the right neutral area 87 of the cam screw 91. The left bias spring 110 is mounted around the left end 94 of the cam screw 91 and pushes against both the left stop 112 and against the left tripping cam 102. The right bias spring 111 is mounted around the right end 93 of the cam screw 91 and pushes against both the right stop 113 and against the right tripping cam 101. The left trip lever 104 is pivotally fixed to the housing by the fixation means 108. The piston support roller 106 is rotatably mounted at the top of the left trip lever 104. The right trip lever 103 is pivotally mounted to the housing 12 by the fixation means 109. The roller 107 is rotatably mounted at the top of the right trip lever 103. The tension connector 105 is connected to and between the left trip lever 104 and the right trip lever 103. The cam screw gearing means 114 is connected to the extension 95 of the cam screw 91. As shown in FIG. 6, the various cams are held by means of the holding bar 84 which is emplaced in the cam recesses 89 to insure that they move in step with the shaft 116 of the valve being actuated. In an alternate design, each cam may have a hexagonal member mounted thereon, such as the hexagonal member 118 as shown in FIG. 8. As shown in FIG. 8, the angular member 119 can be employed instead of a bar to hold the cams.

Figure 7:
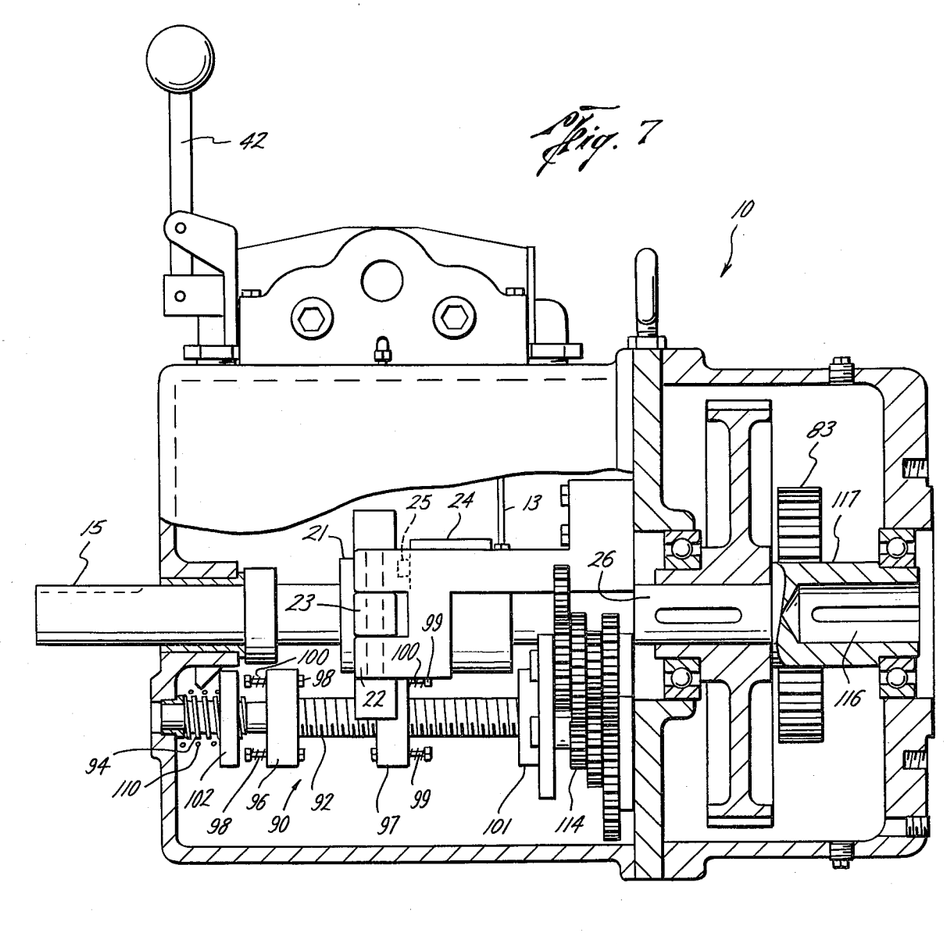
FIG. 7 is an elevational view in partial cut away of an actuator according to the present invention.

The disengagement means 20 automatically disengages a manual operation means such as the manual operation means 16 as shown in FIGS. 1, 7 and 8. The manual operation means 16 as shown includes the handwheel 17 and the handwheel shaft 15. The cylinder 24 of the disengagement means 20 receives part of the input gas 14 through the disengagement means line 13 which is connected between the input line 32 and the cylinder 24. The cylinder 24 contains the piston 25 which is movably mounted therein and which, upon the application of the input gas pressure to the piston 25 moves to contact the clutch lever 23 which is pivotally connected to the first clutch 21 on the handwheel shaft 15. The clutch lever 23 extends outside of the housing 12 for manual operation. As shown in FIG. 1, the first clutch 21 coacts with the second clutch 22 of the shaft 26 so that in the manual operation mode turning the handwheel 17 will result in the turning of the shaft 26. Movement of the clutch lever 23 by the piston 25 results in the disengagement of the first clutch 21 from the second clutch 22 thereby preventing the manual rotation of the shaft 26. The pressure of gas on the piston 25 prevents the manual movement of the clutch lever 23 which is in contact with the piston 25.

FIGS. 1 through 4 illustrate the sequence of operation of the gas operated actuator according to the present invention in schematic form. As shown in FIG. 1, the input gas 14 has not yet reached either the selector valve means 40 or the disengagement means line 13. Also, as shown in FIG. 1, the first clutch 21 is in engagement with the second clutch 22 permitting the manual rotation of the shaft 26.

Referring now to FIG. 2, the input gas 14 has passed through the filter 11 and through the lubricator 115 and has reached the selector valve means 40, but, since the handle 42 is in the middle position, the input gas 14 is prevented from passing to either of the limit valve means lines 43 or 44. As shown in FIG. 2, part of the input gas 14 has gone down the disengagement means line 13 to the cylinder 24, forcing the piston 25 outwardly so that it has contacted and pushed the clutch lever 23 thereby disengaging the first clutch 21 from the second clutch 22 and rendering it impossible to rotate the shaft 26 by hand.

Referring now to FIG. 3, the handle 42 of the selector valve means 40 has been moved to the left position permitting the input gas 14 to flow through the selector valve means 40 and into the forward limit valve means line 43 and thence to the forward limit valve means 60. Upon entering the top chamber 64 of the forward limit valve means 60, the input gas 14 applies pressure to the poppet 62 and it also passes around the poppet 62 and into the bottom chamber 65, exiting the bottom chamber 65 through the opening 71 (shown in FIG. 5) into the forward motor line 33. A portion of the input gas 14 exits from the bottom chamber 65 through the opening 69 into the left chamber 72 of the exhaust means 70. The force of the input gas in the chamber 72 of the exhaust means 70 pushes against the poppet 76 and moves the poppet 76 so that the O-ring 78 contacts the shoulder 82 thereby preventing any further flow of gas into the middle chamber 73. The bulk of the input gas 14 now travels through the forward motor line 33 to the motor means 28 which is operated by the gas pressure. Operation of the motor means 28 by means of the gas pressure causes the shaft 29 to rotate thereby rotating the motor gearing means 30, and the actuator gearing means 83, resulting in rotation of the drive shaft 116 of the valve to be actuated. The female socket 117 (FIG. 7) is formed of the end of the shaft 26. The female socket 117 is keyed to receive the shaft 116. Once the input gas 14 has passed through the motor means 28, it exits the motor means 28 and enters the reverse motor line 34. The gas traverses the reverse motor line 34 and enters the bottom chamber 55 of the reverse limit valve means 50. The selector valve means 40 prevents the gas from passing through the selector valve means 40 and back into the input line 32. Therefore, the gas is forced to go from the bottom chamber 55 of the limit valve means 50 through the opening 59 and into the right chamber 74 of the exhaust means 70. The gas then passes into the middle chamber 73 and is exhausted to the atmosphere through the exhaust port 80.

The motor means 28 with the motor gearing means 30 drives the actuator gearing means 83 which turns the shaft 26. The shaft 26 is interconnected with the second shaft gearing means 27. The second shaft gearing means 27 moves in phase with the actuator gearing means 83. The second shaft gearing means 27 is interconnected with the limit gearing means 88 which is in turn interconnected with the cam screw gearing means 114. The ratio of the limit gearing means 88 to the second shaft gearing means 27 is selected as desired and can be selected to match the required number of rotations to open or close the valve to which the actuator 10 is connected. The limit gearing means 88 drives the cam screw gearing means 114 which results in the turning of the cam screw 91. The two major cams 96 and 97 and the two tripping cams 101 and 102 are prevented from turning by means of the holding bar 84. The movement of the two major cams 96 and 97 corresponds to the movement of the cam screw gearing means 114, the limit gearing means 88, the second shaft gearing means 27, the shaft 26 and therefore to the actuator gearing means 83. As the cam screw 91 turns, the major left cam 96 moves toward the left trip cam 102 which is in an idling position on the left neutral area 86 of the cam screw 91. As the major left cam 96 moves toward the left trip cam 102, the finger means 98 of the major left cam 96 contact and push the left trip cam 102 so that the left trip cam 102 moves into threaded engagement with the left end 94 of the cam screw 91. Because the left end 94 of the cam screw 91 has a coarse thread, the left trip cam 102 moves rapidly toward the left trip lever 104. The piston 68 of the forward limit valve means 60 is resting upon the left trip lever roller 106. The further movement of the left trip cam 102 results in the tripping or pivoting of the left trip lever 104 thereby permitting the piston 68 with its corresponding poppet 62 to move downwardly so that the O-ring 66 of the poppet 62 moves into sealing contact with the shoulder 67 of the bottom chamber 65 of the forward limit valve means 60 thereby shutting off the gas pressure in the forward motor line 33 so that the motor means 28 ceases to operate. By moving the handle 42 of the selector valve means 40 to the right position, this operation will be reversed and the various shafts and gearing means will rotate in the opposite direction.

I claim:
1. A gas-operated valve actuator for rotating the input shaft of a valve, the actuator comprising:
 a body,
 selector valve means mounted to the body for selecting and permitting gas flow through either a forward motor line connected between a gas source and a motor means or a reverse motor line connected between the gas source and the motor means,
 limit valve means mounted to the body in communication with each motor line for controlling the flow of gas in the respective line,
 motor means mounted to the body and operable by the gas from the gas source flowing through the selected motorline, the motor means connected to the input shaft for rotating it, and
 quick shutoff means for the limit valve means, the quick shutoff means mounted to the body and comprising:
 cam screw means mounted to the body in movable coaction with the input shaft via intermediate gears there between, said cam screw means having a fine pitched threaded portion and a course pitched threaded portion and a neutral area disposed between the threaded portions,
 major cam means movably mounted on the cam screw means, the major cam means provided with threads for coacting with the threaded portions of the cam screw means, tripping cam means movably mounted on the cam screw means, the tripping cam means provided with threads for coacting with the threaded portions of the cam screw means and disposed so that the major cam means moving on the fine pitched threaded portion moves to contact and urge the tripping cam means onto the course pitched threaded portion toward limit valve support means, limit valve support means pivotally connected to the body and supporting the limit valve means in open position, said limit valve support means disposed so that upon contact by the tripping cam means, the limit valve support means pivots thereby shutting off the limit valve means, control means for alternately shutting off the flow in the selected motor line when the input shaft reaches its travel limit.

2. The actuator of claim 1 wherein the valve to be actuated has manual operating means connected thereto and wherein the actuator has disengagement means mounted to the manual operating means for disengaging the manual operating means upon the application of gas to the actuator.

3. The actuator of claim 2 wherein the manual operation means includes a first shaft and a second shaft, the first shaft having manual rotation means mounted thereon and first clutch means mounted thereon, the second shaft having second clutch means mounted thereon and engageable with the first clutch means, the second shaft having engaging means for engaging the motor gear means, the second shaft interconnected with the input shaft of the valve to be actuated, and the disengagement means comprising:

a clutch lever pivotally connected to the first clutch means and pivotally connected to the body, a gas operated clutch cylinder mounted to the body and having a clutch cylinder piston movably mounted therein, the piston disposed so that upon application of gas to the actuator the piston moves to contact and push the clutch lever which in turn pivots disengaging the first and second clutch means from each other and thereby preventing the manual rotation of the second shaft, motor gear means and the input shaft by means of the manual rotation means.

4. The actuator of claim 1 wherein an input line is disposed between the actuator and a gas power source for transmitting gas to the actuator and wherein the forward motor line is disposed between the motor means and the input line for providing the communication of gas between the input line and the motor means and wherein the reverse motor line is disposed between the motor means and the input line for providing the communication of gas between the motor means and the input line and wherein the control means is disposed between and in communication with the input line and both motor lines, and the control means includes:

selector valve means for selectively permitting gas to flow from the input line through either the forward motor line or the reverse motor line, or for shutting off the gas from the input line so that no gas flows to either motor line, forward limit valve means having a movable first poppet mounted therein for controlling the flow of gas in the forward motor line, reverse limit valve means having a movable second poppet mounted therein for controlling the flow of gas in the reverse motor line, and exhaust valve means having an exhaust port to the atmosphere, the exhaust valve means disposed between the forward limit valve means and the reverse limit valve means and in communication with them so that gas flowing to one of the limit valve means will activate the exhaust valve closing off the exhaust port so that the gas passes down that limit valve means's respective motor line to the motor means, the exhaust valve means remaining in communication with the other limit valve means so that the gas passing through the motor means and into the other motor line and limit valve means will pass through the exhaust port to the atmosphere, the other limit valve closing off its motor line to the selector valve to insure that the gas is exhausted through the exhaust port.

5. The actuator of claim 4 wherein the motor means has a motor drive shaft extending therefrom and connected with the input shaft of the valve to be actuated and wherein the motor means has motor gear means mounted to the motor drive shaft, and wherein the control means has limit valve shutoff means comprising:

a forward limit valve means support pivotally mounted to the body beneath the first poppet, a reverse limit valve means support pivotally mounted to the body beneath the second poppet, the poppet in the limit valve means through which gas is initially permitted to flow moving to contact and rest on its corresponding support, a cam screw having a midsection with fine pitch threads and two ends each with course pitch threads, a cam screw gear mounted to the cam screw, limit gear means disposed between and interconnected with the cam screw gear and the motor gear means for imparting the motion of the motor gear means to the cam screw gear so that rotation of the motor gear means results in rotation of the cam screw, two major cams movably mounted on the midsection of the cam screw, the major cams having threads for threaded movement on the cam screw as the cam screw turns, each major cam having a finger means mounted thereon, each finger means extending toward an opposite end of the cam screw, and two tripping cams one corresponding to each limit valve means support and disposed initially on the fine pitch thread of the cam screw, one on either side of the two major cams, each of the tripping cams being contactable by the finger means of its corresponding major cam so that upon contact the contacted tripping cam moves from the fine pitch thread of the cam screw onto the course pitch thread of the cam screw to contact and move its respective limit valve means support so that the limit valve means support pivots thereby releasing the corresponding poppet of the limit valve means, the poppet moving to close off the corresponding motor line so that the flow of gas to the motor means ceases.

* * * * *